Oct. 12, 1926.
J. ROSS
BALING PRESS
Filed Sept. 3, 1925  2 Sheets-Sheet 2
1,603,150
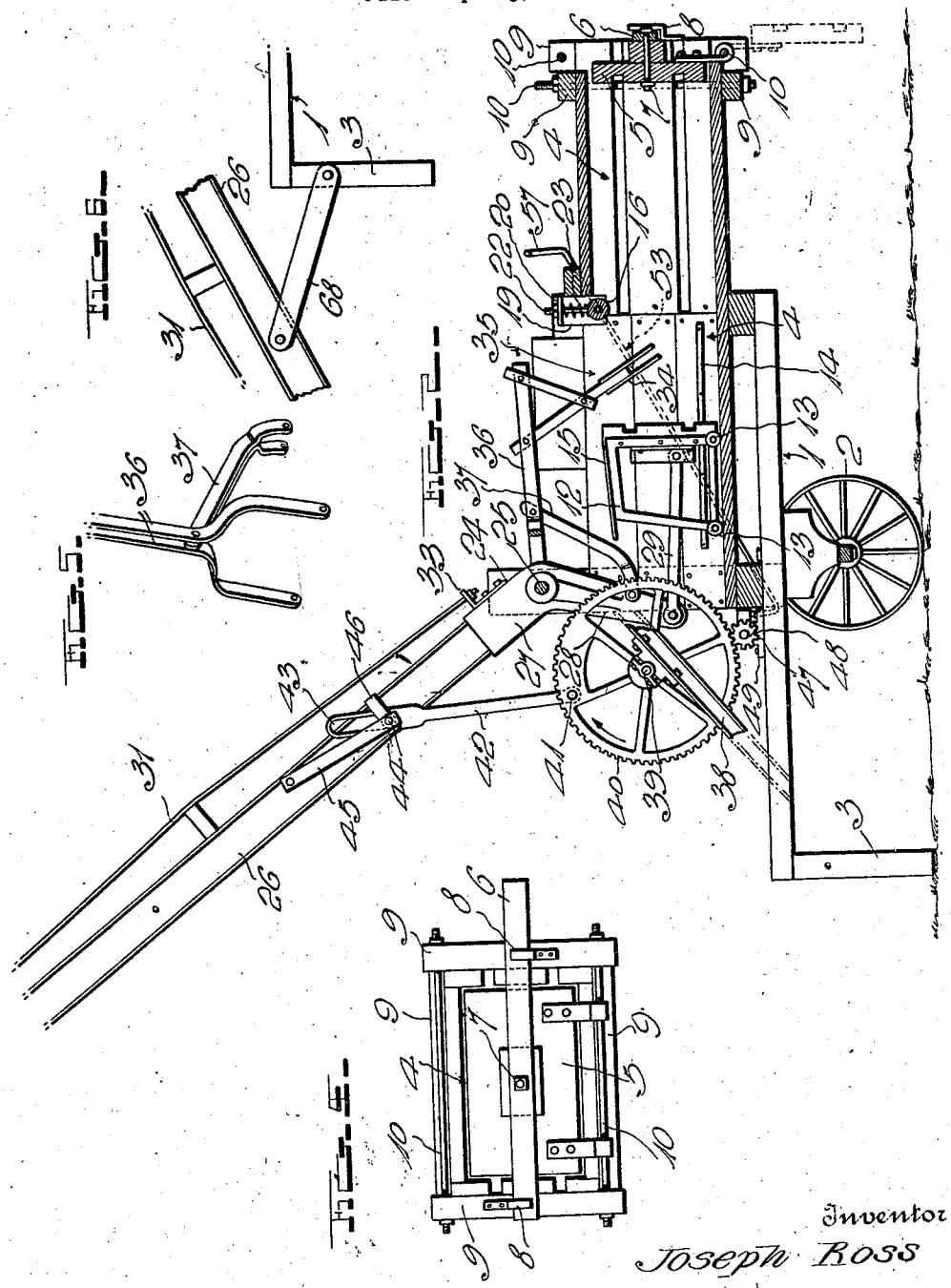
Inventor
Joseph Ross
Witness
H. Woodard
By H. B. Willson Yeo
Attorneys Patented Oct. 12, 1926.

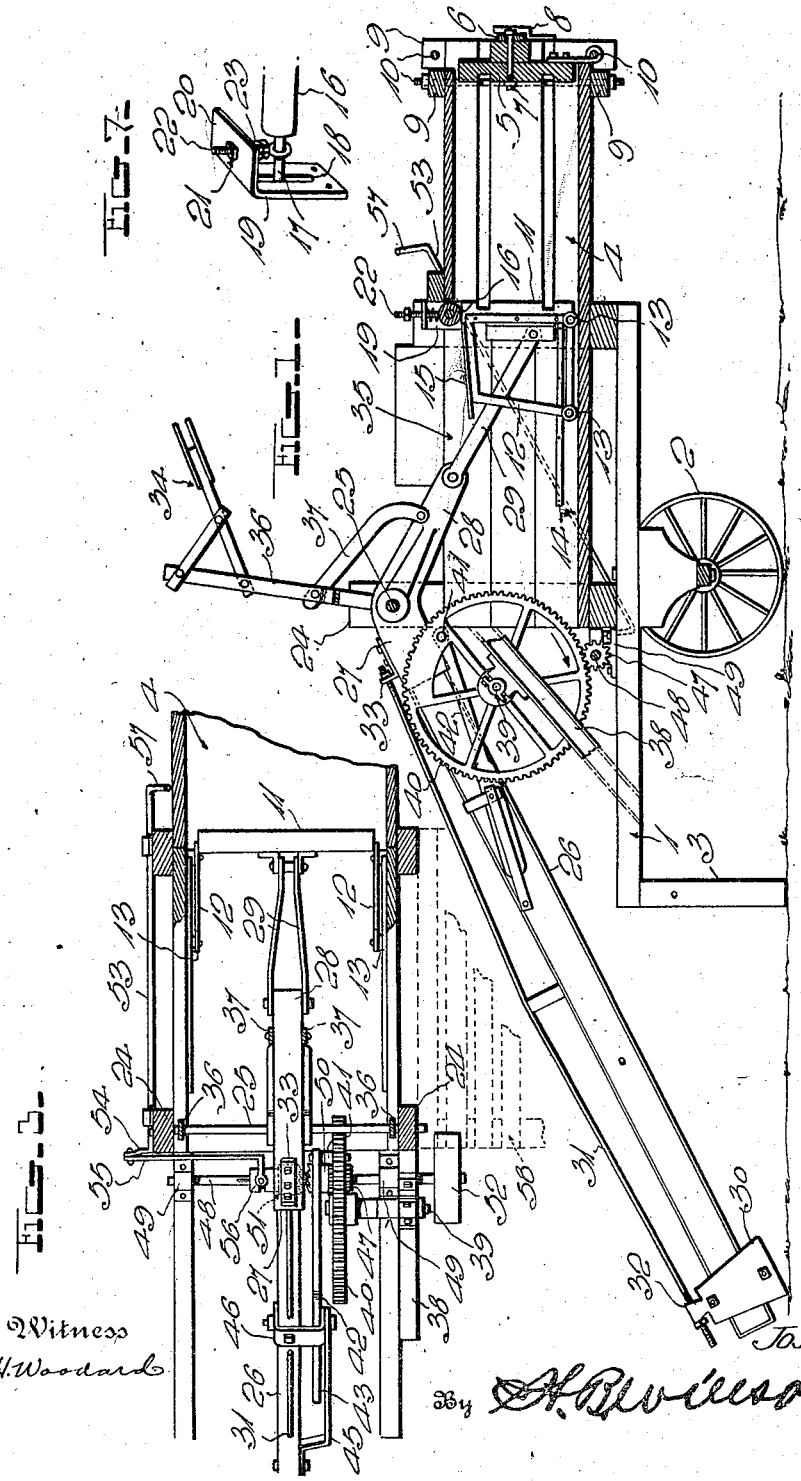

1,603,150

UNITED STATES PATENT OFFICE.

JOSEPH ROSS, OF WEST ALBANY, INDIANA.

BALING PRESS.

Application filed September 3, 1925. Serial No. 54,354.

The invention relates to improvements in baling presses of the type in which a weighted arm is raised by power to retract a plunger in the baling chamber and is then automatically released, so that descent of the arm will actuate said plunger to compress the material being baled.

The primary object of the invention is to provide new and improved actuating means for the swinging, weighted arm.

Another aim is to provide a feeder or tamper of novel form to force the material through the throat of the press into the baling chamber when the swinging arm is raised.

With the foregoing in view, the invention resides in the novel subject matter hereinafter described and claimed, the description being supplemented by the accompanying drawings.

Figure 1 is a side elevation partly in section of a baling press constructed in accordance with my invention, the plunger being shown in projected position.

Figure 2 is a view similar to Fig. 1 showing the plunger retracted and the weighted arm raised, in readiness to again project said plunger.

Figure 3 is a partial plan view, partly in horizontal section.

Figure 4 is an end elevation.

Figure 5 is a perspective view of a portion of the feeder.

Figure 6 is a detail side elevation illustrating the manner in which the weight-carrying arm may be connected with the frame of the press to act as a tongue for drawing the machine from one point to another.

Figure 7 is detail perspective view illustrating the preferred manner of mounting the tucker roller.

In the drawings above briefly described, the numeral 1 designates a frame structure which is preferably supported by a pair of wheels 2 and a pair of rigid legs 3, said frame, and all parts carried thereby, being intended to be tilted so that the legs clear the ground, when the press is to be drawn from one place to another. Mounted upon the frame 1, is a horizontally elongated baling chamber 4 having a hinged rear door 5 which may be secured in place by any suitable means, such as a horizontal locking lever 6 fulcrumed thereto at 7 and engageable with rigid keepers 8 carried by the rear end of the baling chamber structure. This rear end of the baling chamber is preferably provided with the usual sets of bars 9 and bolts 10, by means of which it may be slightly contracted to compress the bale transversely in the well known manner.

An appropriate plunger 11 is movable in the baling chamber 4 and preferably includes a frame structure 12 having rollers 13 traveling on the bottom of said chamber, under a pair of guide tracks 14. A substantially horizontal plate 15 is preferably carried by the upper side of the frame 12 to prevent any hay or the like from falling into the chamber behind the plunger, when the latter is projected as shown in Fig. 1.

Co-operable with the plunger 11 in a well known manner, is a tucker roller 16 which is preferably mounted in the manner illustrated. At 17, the roller shaft is illustrated. said shaft projecting beyond the ends of the roller and being received in vertical slots 18 in vertical plates 19 suitably secured at opposite sides of the baling chamber. These plates are provided with inwardly extended upper ends 20 having openings 21 in which the shanks or eye bolts 22 are slidably mounted, the eyes of said bolts receiving the ends of the shaft 17. Coiled compression springs 23 are interposed between the eyes and the plate ends 20 and they exert a constant downward stress on the shaft and roller, so that when the plunger 11 moves rearwardly from under said roller, the latter will be forced downwardly to tuck loose ends of hay, straw or the like downwardly in position to be caught by the plunger when it again is projected.

At the front end of the baling chamber 4, a pair of rigid posts 24 are shown, said posts being secured to opposite sides of said chamber. A transverse shaft 25 extends horizontally between and is supported by these posts and a vertically swinging operating arm or lever 26 is pivotally mounted near one of its ends, on said shaft. Preferably, the pivoted end of the arm or lever 26 is formed by a suitable casting 27, one end of which forms a short arm 28 for the lever, preferably disposed at an obtuse angle to the major portion or long arm of said lever. This short arm 28 is connected by links 29 with the plunger 11. The outer end of the lever 26 is provided with an operating weight 30, and a suitable truss rod 31 is preferably provided for said lever, one end of the rod being engaged with a lug 32 on said weight, while its other end may be suitably anchored to the casting 27, as indicated at 33. When the lever 26 is raised to the position shown in Fig. 2, it retracts the plunger 11, and when said lever is allowed to descend, it again projects the plunger as shown in Fig. 1. Novel means, described below, are employed for raising the lever whenever required and then releasing it.

A suitable feeder 34 is provided for downward movement through the inlet throat 35 of the baling chamber, to project the hay, straw or the like into the forward path of the plunger 11, and this feeder is preferably movable bodily with the lever 26. In the present showing, the feeder includes a pair of carrying arms 36 whose outer ends are closely related, while their inner ends are widely spaced and are mounted on the shaft 25 at opposite sides of the casting 27, these arms being connected with the arm 28 by links 37. When the lever 26 swings upwardly and the plunger 11 retracts, the feeder 34 moves downwardly through the throat 35 as seen in Fig. 2, and when said lever 26 descends to project the plunger 11, the feeder 34 moves upwardly out of the throat as will be clear from Fig. 1.

A rigid bar 38 has been shown secured at its upper end to one of the posts 24 and secured at its lower end to the base frame 1, said bar declining forwardly from the baling chamber. This bar supports a short transverse shaft 39 upon which a large gear 40 is mounted, said gear having a wrist pin 41, to which one end of a pitman 42 is connected, while the other end of said pitman is slidably connected with the lever 26, this sliding connection being preferably established by providing a longitudinal slot 43 in the pitman, and equipping the lever 26 with a roller-carrying stud 44 received in said slot, the stud being appropriately braced by metal straps or the like 45 and 46.

A pinion 47 meshes with the gear 40 and is loose upon a transverse horizontal shaft 48 which is rotatably mounted in appropriate bearings 49, under the shaft 39. Rigidly secured to the pinion 47 and also loose upon the shaft 48, is a clutch member 50 which is co-operable with another clutch member 51, the latter being slidably keyed to the shaft 48. This shaft is constantly rotated, for which purpose I have shown a belt pulley 52 on one of its ends, but the clutch member 51 is normally out of mesh with the member 50 and hence the shaft rotates idly. When the arm 26 is to be raised however, to retract the plunger 11 and to then cause projection of said plunger, the member 51 is shifted into mesh with the member 50. Then, the shaft 48 drives the pinion 47 which in turn rotates the large gear 40. This gear, through the instrumentality of the pitman 42, raises the arm 26 to the position shown in Fig. 2, the plunger 11 having in the meantime been retracted and the feeder 34 downwardly projected. As soon as the wrist pin 41 moves over dead center, the weighted arm 26 rotates the gear 40 more rapidly than it would be rotated by the pinion 47, the result being that the cam-like teeth of the two clutch members 50 and 51, force the member 51 to an inoperative position, allowing unhampered descent of the weighted arm 26, to project the plunger 11 and compress the material forced into advance of said plunger, by the previous downward movement of the feeder 34. All parts remain in the position to which they are moved by the descent of the arm, while more material is being placed in the hopper or throat 35 of the baling chamber, and when the desired amount of material has been so placed, the clutch member 51 is again thrown into play to again rotate the gear 40 and raise the arm or lever 26. It may here be explained that the sliding connection between the pitman 42 and lever 26, permits the gear 40 to move the pitman from the position of Fig. 1 to a position at which it will thrust upwardly upon the roller-carrying struts 44.

Any desired means may be provided for operating the clutch member 51. Preferably, however, an inclined rock shaft 53 is provided at one side of the baling chamber, the lower end of said shaft having a crank arm 54 connected to a transverse bar 55 having an appropriate running connection 56 with the clutch member 51. The upper end of the shaft 53 is provided with a crank arm 57 disposed over the baling chamber, in position to be depressed by the foot of the attendant standing upon said chamber, it being the duty of such attendant to take the hay or the like from the usual platform 58 (Fig. 3) and place it into the hopper or throat of the press. When the desired quantity has been so placed, the attendant simply depresses the arm 57, thus throwing the machine into gear and causing it to operate as above set forth.

The completed bales may be wired in any well known manner and obviously the machine may be used either as a continuous press or as a box press. When the machine is continuously operated, the usual division blocks (not shown) are of course used.

When the machine is to be drawn from one place to another, the weight 30 may be removed, and a bar 68 may be bolted to the arm 26 and to a suitable part of the frame structure, to hold said arm against pivotal movement with respect to said frame structure. Then, the arm may be used as a tongue for drawing the machine from one place to another, as will be clear from Fig. 6. Obviously, when the machine is being transported, it is tilted so that the legs 3 clear the ground.

It will be seen from the foregoing that a simple and inexpensive press has been provided for carrying out the objects of the invention and while excellent results have been obtained from the general construction shown, it is to be understood that within the scope of the invention as claimed, numerous modifications may be made.

I claim:—

1. An actuating means for a weighted plunger-actuating arm of a press, said actuating means comprising a large gear mounted on an axis parallel with the axis of said arm, said gear having a wrist pin, a pitman connected to said wrist pin and having a slidable connection with said arm, a pinion meshing with said gear, driving means for said pinion, including a clutch mechanism, and manually controlled means for bringing said clutch mechanism into play to cause the gear and pitman to raise the aforesaid arm to a point at which the wrist pin passes dead center, said clutch mechanism having a portion which is then operable to automatically free said pinion, allowing the arm to descend.

2. A feeding means for a baling press having a swinging arm mounted on a transverse shaft adjacent the throat of the press, said feeding means comprising a feeder movable bodily with said arm and downwardly movable into said throat when the arm is raised, said feeder having a pair of carrying arms mounted on said shaft at opposite sides of the first named arm, and a link connecting said pair of arms with said first named arm.

In testimony whereof I have hereunto affixed my signature.

JOSEPH ROSS.